US005896965A

United States Patent [19]
Gopalswamy et al.

[11] Patent Number: 5,896,965
[45] Date of Patent: Apr. 27, 1999

[54] MAGNETORHEOLOGICAL FLUID FAN CLUTCH

[75] Inventors: Swaminathan Gopalswamy, Rochester Hills; Samuel Miller Linzell, Troy; Gary Lee Jones, Farmington Hills, all of Mich.; William Charles Kruckemeyer, Beavercreek; Gary Lee Johnston, Pleasant Hill, both of Ohio

[73] Assignee: General Motors Corporation, Detroit, Mich.

[21] Appl. No.: 08/867,640

[22] Filed: Jun. 2, 1997

[51] Int. Cl.⁶ .................................................. F16D 35/00
[52] U.S. Cl. ...................................... 192/21.5; 192/58.41
[58] Field of Search ................................. 192/21.5, 58.4, 192/58.41; 188/267.2

[56] References Cited

U.S. PATENT DOCUMENTS

| | | | |
|---|---|---|---|
| 2,543,394 | 2/1951 | Winther | 192/21.5 |
| 2,813,605 | 11/1957 | Buslik et al. | 192/21.5 |
| 3,002,595 | 10/1961 | Weir | 192/58.5 |
| 3,394,784 | 7/1968 | Searle | 192/21.5 |
| 4,227,861 | 10/1980 | LaFlame | 416/169 A |
| 4,285,421 | 8/1981 | Halsted | 192/84 C |
| 4,302,156 | 11/1981 | LaFlame | 416/169 A |
| 4,310,085 | 1/1982 | LaFlame | 192/58 B |
| 4,920,929 | 5/1990 | Bishop | 123/41.49 |
| 4,957,644 | 9/1990 | Price et al. | 252/62.52 |
| 4,967,887 | 11/1990 | Annacchino et al. | 192/21.5 |
| 5,137,128 | 8/1992 | Takei et al. | 192/21.5 |
| 5,598,908 | 2/1997 | York et al. | 192/21.5 |

OTHER PUBLICATIONS

Rabinow, J.—The Magnetic Fluid Clutch, AIEE Transactions, vol. 67, 1948.
Rabinow, J.—Magnetic–Fluid Control Devices, presented at the SAE National Transportation Meeting, Cleveland, 1949.
Ramakrishnan, S. et al—Theory and performance of the disc–type electromagnetic particle clutch under continuous slip service, IEE Proc., 1980.
Grau R. et al—The Magnetic Particle Clutch (A Versatile Control Element for Rocket Systems), Aerospace Engineering 1961.
Varadakumari, G. et al—Viscous torque of disc–type magnetic fluid slip clutches, IEEE Proc., 1984.
Magnetic Particle Clutch, Automobile Engineer, May 1954 pp. 181–186.
U.S. Ser. No. 08/862,914 "Magnetorheological Transmission Clutch," filed May 23, 1997; issuing as U.S. Pat. No. 5,823,309 on Oct. 20, 1998.
U.S. Ser. No. 08/867,623 "Split Rotor Cooling Fan Clutch," filed Jun. 2, 1997.
U.S. Ser. No. 08/869,299 "Passive Magnetorheological Clutch," filed Jun. 4, 1997.
U.S. Ser. No. 08/867,638 "Magnetorheological Fluid Clutch with Minimized Reluctance," filed Jun. 2, 1997.

*Primary Examiner*—Rodney H. Bonck
*Attorney, Agent, or Firm*—Jeffrey A. Sedlar

[57] ABSTRACT

A magnetorheological fluid fan clutch effects modulated rotational motion transmission between a rotatable input shaft carrying an input clutch plate and a housing having a front cover and a rear cover forming a cavity about the input clutch plate wherein the front and rear covers operate as output clutch plates. A nonmagnetic spacer is positioned between the front and rear covers and radially outside the input clutch plate. A bearing supports the housing on the input shaft through the rear cover so that the input clutch plate is rotatable on the input shaft relative to the housing. Magnetorheological fluid is carried in the cavity, through which torque is variably transferred between the input clutch plate and the housing. A coil is positioned radially outside the nonmagnetic spacer and carries a variable electrical current to effect a variable magnetic field across the input clutch plate and through the magnetorheological fluid providing modulated torque transmission between the input clutch plate and the housing.

10 Claims, 5 Drawing Sheets

MAGNETORHEOLOGICAL FLUID FAN CLUTCH

TECHNICAL FIELD

This invention relates to a magnetorheological fluid fan clutch and more particularly, to an engine driven cooling fan clutch utilizing a magnetorheological suspension fluid for the modulated transmission of rotational motion from an input element driven by a vehicle engine to an output element connected to the cooling fan.

BACKGROUND OF THE INVENTION

A magnetorheological fluid is a suspension of finely powdered iron or iron alloy in a fluid such as mineral oil or silicone. A magnetorheological fluid clutch may consist of this type of fluid suspension carried between clutch plates, with an associated device providing a desired magnetic flux level across the clutch plates and the fluid. The clutch plates are typically made of a material with high permeability such as iron. When the magnetic flux is generated across the clutch plates and through the magnetorheological fluid, the suspended particles respond. The response is embodied as an attraction of the clutch plates to the magnetorheological fluid particles. This characteristic phenomenon, combined with the internal magnetic attraction between the fluid particles, results in torque transmission between the clutch plates. In the past, magnetorheological fluid clutches have been referred to as magnetic particle fluid clutches. Many of the particle fluids used previously have been dry powders. With the development and use of suspensions of powders in a fluid medium such as mineral oil or silicone, studies were conducted into the rheology of particle fluids under a magnetic flux, and consequently the terminology of magnetorheological fluids has been coined.

Drives for the cooling fans of cars and trucks initially comprised a simple solid shaft extending from a drive pulley to the fan. Subsequently, the art realized that the fan did not require continuous engagement. It is known that the power consumed by driving a fan is proportional to the cube of the fan speed, whereas the cooling rate is typically proportional to the square root of the fan speed. Therefore, it is expected that considerable improvement in power consumption and fuel economy can be achieved by controlling fan activation so that the fan is disengaged when operating conditions permit. This realization led to the development of disengageable fan drives.

Typical production cars most commonly use electrically driven fans for readily disengaging the fan. The fan is driven independent of the engine through an electric motor, and the electric motor is turned on or off as needed. These electric motors are typically rated for a maximum of a few hundred watts. The power requirements of a cooling fan for trucks typically reach up to several kilowatts. Therefore, an electric fan drive is not practical for higher cooling requirement applications such as trucks.

The disengageable fan drive most commonly used in higher cooling rate applications, is the viscous fluid clutch. Torque transmission is typically achieved by the viscous drag force between two grooved clutch plates shearing a thin layer of silicone oil. The viscous fluid clutch is often composed of two sections, one contains the clutch grooves and performs the shearing function, and the other acts as a reservoir for the silicone fluid. Silicone fluid passes from the reservoir to the clutch grooves through an orifice. A thermostat valve situated on the clutch senses the temperature of the air leaving the radiator, and correspondingly opens or closes the orifice. This in turn, fills or drains the clutch grooves with the silicone fluid, engaging or disengaging the clutch.

While the viscous fluid clutch represents a significant improvement over the solid shaft drive, it continues to have certain drawbacks. The viscous clutch operates with bi-state capability meaning it can only be either completely engaged or completely disengaged. Engagement occurs at or near engine speed, even if the actual cooling requirement could be supplied at a lower speed. This results in inefficiencies by using more engine power for fan driving torque than may be required for the actual operating conditions encountered. The viscous fluid clutch also results in undesirable fan noise generation in many operating situations. The cyclic nature of thermostatic fan control causes the fan speed to oscillate, which can be particularly noticeable when the associated engine is at idle. The level of noise generation is typically proportional to the fifth or sixth power of the fan speed. Since the viscous fluid clutch is only bi-state, the fan speed is very high when the clutch is engaged resulting in increased noise generation. With a viscous fluid clutch, the temperature control system is also undesirably limited. A first limitation arises from the bi-state operational nature of the device, because the system provides only the two choices of maximum cooling or minimum cooling. A second limitation arises because the engine coolant temperature is indirectly sensed, from the air passing through the radiator. The resultant less than optimal temperature control, can lead to degraded engine performance and hunting of the fan clutch (resulting in more noise).

Providing adequate cooling is the key function of the radiator fan. The bi-state viscous fluid clutch only provides either maximum cooling or minimum cooling. Adding a means of modulating fan speed so that input torque is tailored to the amount of cooling required, avoids certain undesirable viscous fluid clutch characteristics. A modulating fan clutch controls the fan speed to achieve a constant cooling rate with the same total cooling as the cycling viscous fan clutch for every unit of time. Modulating control strategy reduces the maximum speeds that the fan operates at, potentially leading to improvements over the viscous fan clutch. For example, using existing relationships between fan speed, cooling rate, and fan power consumption, a modulating strategy can result in increases in engine operating efficiency. Reducing fan clutch driving load results in greater engine power availability. This becomes particularly significant in applications such as trucks, since the fan power consumption is of the order of several kilowatts at higher speeds, and is directly taken from the engine. Additionally, with reduced fan speeds, a significant reduction in fan noise is possible. Noise reduction is further achieved because of the elimination of the cycling of the fan clutch on and off.

Several types of fan drives to achieve fan speed modulation have been, and are being investigated by the automotive industry. While electric drives can be easily adapted to modulate the fan speed, they aren't practical in all applications. One known manner of achieving fan modulation uses a hydrostatic drive unit between the engine and the fan. In this type of device, the engine drives a pump, and the fluid from the pump drives a fluid motor with fluid flow control effected by valves. By controlling the fluid flow, the motor speed and the fan speed, are modulated. A hydrostatic drive offers the advantage of remote location of the fan with respect to the engine making it suitable for transverse engines. However, complexity and cost are concomitant drawbacks. The hydrostatic drives also typically suffer from undesirable inefficiencies, particularly when operated at partial loads.

Other types of modulating fan drives that have been investigated include the use of wet clutches that use controlled circulation of the silicone oil in the general viscous fluid clutch to modulate speed. Control difficulties and complexity are associated undesirable drawbacks with these methodologies. Packagability, simplicity, and the ability to smoothly control the torque capacity of a fan clutch continues to be an elusive combination of characteristics. Accordingly, the need for such a device continues to exist.

SUMMARY OF THE INVENTION

An aspect of the present invention, resides in providing a magnetorheological fluid fan clutch embodied in a cost effective design as a solution to the aforementioned drawbacks associated with existing fan clutch devices. In addition to offering the functional advantages of a modulating type fan drive, the simplicity of the present invention's design provides a cost effective solution. In arriving at the present invention, the design process included considering the trade-offs between conflicting design requirements, such as fluid stability, size, mass, cooling, sealing, and manufacturability, to synthesize the present invention while meeting required specifications. According to an aspect of the present invention, the solution utilizes controllability of the yield shear stress of a magnetorheological fluid to effect a modulated drive characteristic.

Advantageously, a fan clutch according to the present invention provides efficiency improvements over viscous fluid clutches. The fan clutch is desirably amenable to precise closed loop control of the engine coolant temperature. The magnetorheological fluid fan clutch also beneficially provides relatively low machining costs by avoiding the lands and grooves associated with typical viscous fluid clutch. Desirably, engine coolant temperature is directly used to determine fan speed.

Other aspects of the present invention surround the preferred structure for carrying out the aforementioned goals. A magnetorheological fluid fan clutch according to these aspects preferably includes an input shaft connected with a separately formed input clutch plate. The input clutch plate is housed between front and rear covers that operate as output clutch plates. The front and rear covers are spaced apart by a nonmagnetic spacer and are attached together by nonmagnetic fasteners to maintain the preferred route for magnetic flux path through the device. The rear cover supports the output element on the input element through a bearing arrangement. The front cover is shaped to avoid the hindrance of magnetic flux saturation, while minimizing the amount of material as permitted by mechanical strength limitations.

Preferably, these aspects are further achieved through the coil shape, which is optionally positioned radially away from the center of the clutch to effect increased flux levels. The air gap is located for optimal performance based on a combination of the mechanical layout and the magnetic resistance of the air gap. The length of the air gap, the mating area at the air gap, the length of the fluid gap between the clutch plates, the inner and outer radii of the clutch plate, the number of coil turns, and the current in the coil all determine the torque transmitted across the clutch. These parameters are designed to fit the overall dimensional constraints of the clutch, which have been advantageously set for assembly into the space of an existing viscous fan clutch, while being of comparable weight. Coil current is limited for using simple power electronics which enables the magnetorheological fluid to be used in achieving fan speed modulation.

Since modulation is preferably controlled by a commonly known electronic controller, algorithms are incorporable for engine cooling, including the use of the actual coolant temperature for feedback control, resulting in improved engine coolant temperature control.

Preferably, the input shaft from the engine is connected to a single input clutch plate. This input clutch plate is enclosed by two output plates on either side, which are connected to the fan through the housing. The gaps between the input and output plates are filled with magnetorheological fluid. According to one embodiment of the present invention, an external, stationary coil provides the desired amount of flux across the plates and the fluid. Use of a single plate advantageously enables cost and complexity minimization. However, the use of optional multiple plates enables a further decrease in the size and weight of the assembly.

DESCRIPTION OF THE PREFERRED EMBODIMENT

Figure 1:
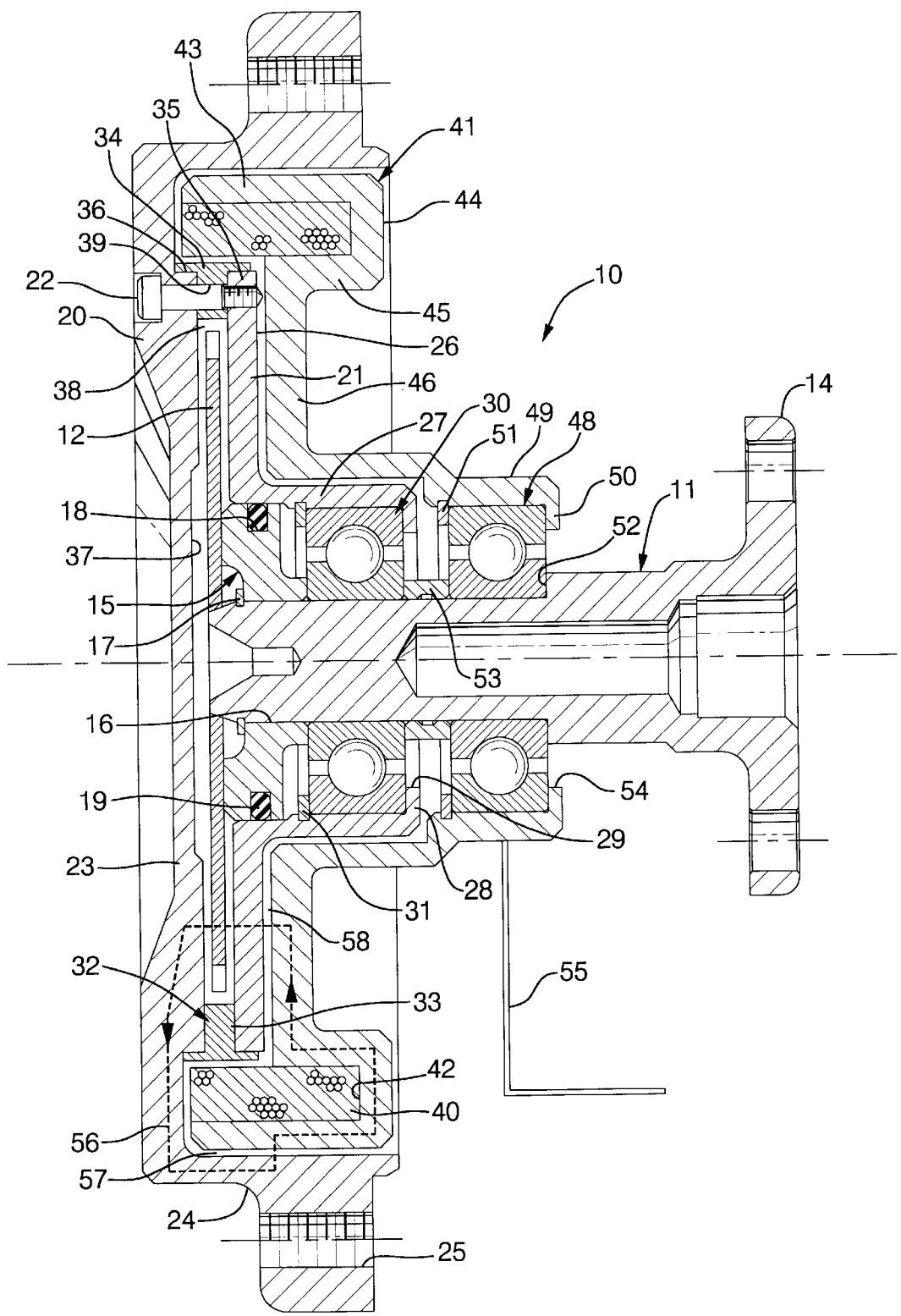
FIG. 1 is a cross sectional illustration of a fan clutch according to the present invention.

Referring to the drawings, illustrated in FIG. 1 is a magnetorheological fluid fan clutch assembly 10 using the torque transmission characteristics of the contained fluid, which are variable in response to a variable electromagnetic field. Fan clutch 10 is generally embodied as a single input plate design, with the nonrotating coil supported on rotating input shaft 11. The input shaft 11 carries the single input clutch plate 12, which is made of a typical material such as steel by a common process such as stamping. The input shaft 11 is adapted to exhibit the same foot print at mounting flange 14 as commonly used existing viscous clutch, so that the magnetorheological fluid fan clutch 10 can be easily retrofitted to existing vehicle designs. The input clutch plate 12 is manufactured separately from the input shaft 11, and the two are connected by an intermediate seal housing 15. The seal housing 15 is made of a non-magnetizable material such as aluminum or stainless steel preventing flux leakage from the clutch plate to the input shaft, advantageously maximizing the achievable torque capacity, and reducing the tendency of the suspended particles to be attracted, which could lead to premature seal wear. The seal housing 15 is formed in a generally annular shape with an opening 16 that receives the input shaft 11. Seal housing 15 is maintained on the input shaft 11 by a snap ring 16, and the input clutch plate 12 is preferably fastened to the seal housing 15 by a conventional means. An annular groove 18, formed around the periphery of the seal housing 15 houses an annular seal 19.

The input clutch plate 12 is housed between the front and rear covers 20 and 21 respectively, which also double as the output clutch plates. The front cover 20 and rear cover 21 are attached together with a plurality of bolts 22. Front cover 20 includes a finned front wall 23 with an integrally formed and rearwardly extending annular wall 24 that includes a series of fan mounting openings 25. Rear cover 21 includes a radially extending wall 26 with an integral rearwardly extending wall 27 that engages seal 19. Wall 26 includes an inwardly turned terminal flange 28 providing an opening 29 that is received over the input shaft 11. Rear cover 21 is rotatably supported on input shaft 11 by a bearing assembly 30 that includes an inner race positioned on the input shaft 11 against the seal housing 15 and an outer race positioned in the wall 26 between terminal flange 28 and a snap ring 31. The inner and outer races are engaged by an interposed series of balls for relatively free rotation.

As a result, the rear cover 21 is normally substantially free wheeling on the input shaft 11. The rear cover 21 also supports the front cover 20 and its associated fan (not illustrated). The rear cover 21 and front cover 20 are engaged through a plate spacer 32. The plate spacer is annular with a T-shaped cross section and includes an inner radially directed section 33 that is received between the front cover 20 and the rear cover 21 and an outer axially directed section 34 that is received around a ledge formed by the outer perimeter 35 of the rear cover 21 and the ledge 36 of front cover 20. The plate spacer 32 seals the outer area of cavity 38 and includes openings 39 that receive the bolts 22. The plate spacer 32 and the bolts 22 are nonmagnetizable to maintain the integrity of the magnetic flux path. The plate spacer 32 is also made of a relatively soft conventional material, since it serves as a static seal for the magnetorheological fluid.

The shape and size of the front cover 20 is designed to avoid magnetic flux saturation, and simultaneously to minimize the amount of material used as permitted by mechanical strength requirements. This optimizes on the overall weight of the clutch. More specifically, the area of the flux path is relatively thick, while the center of the front cover 20 is dished out on the outside. The front cover 20 and the rear cover 21 act as the output clutch plates, and are made of conventional steel for magnetic permeability.

Coil 40 comprises a plurality of turns of wire and is held in the stationary core 41. The coil 40 and the core 41 are positioned on the rear side of the fan clutch 10 so that cooling air flow to the front cover 20 is not obstructed. The core 41 includes groove 42 for receiving the coil 40 and is formed by an axially extending segment 43, a radially extending segment 44 and an axially extending segment 45. The axially extending segment 43 fits relatively closely inside the rearwardly extending annular wall 24 of the front cover 20 providing a large flux interface area. The core 41 also includes a radially extending segment 46 that is positioned near the rear cover 21 with a large flux interface area. The core 41 is supported in a nonrotating position on the input shaft 11 by a bearing assembly 48. The bearing assembly 48 includes an inner race positioned on the input shaft 11 and an outer race positioned in the wall 49 between terminal flange 50 and a snap ring 51. The inner race is positioned between a shoulder 52 on input shaft 11 and a spacer 53 positioned over input shaft 11 against bearing assembly 30. The inner and outer races are engaged by an interposed series of balls for relatively free rotation of the input shaft 11 which extends through the opening 54 formed by terminal flange 50. The core 41 is restrained from rotation and includes a ground strap 55 for connection to the associated vehicle's engine or body (not illustrated). The bearings assemblies 30 and 48 are designed to be of the same size for interchangeability. The flux (indicated by the path 56), jumps the air gap 57 between the front cover 20 and the core 41, and the air gap 58 between the core 41 and the rear cover 21. The air gaps are really only one space that crosses the flux path 56 twice and is designed so that any external material such as water, entering the space naturally flows out under gravity.

Figure 2:
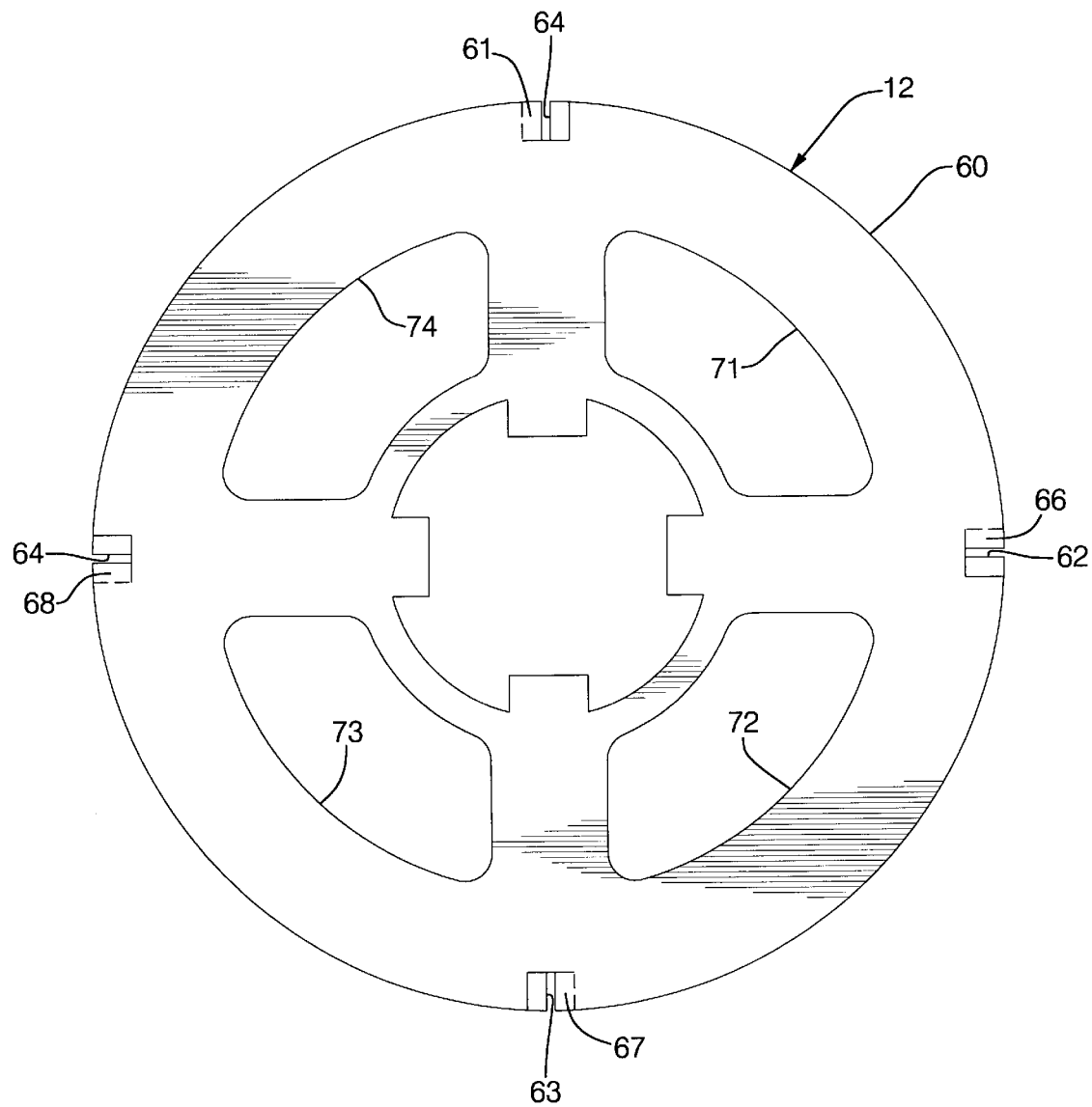
FIG. 2 is a detail illustration of the input clutch plate used in the fan clutch of FIG. 1.

Referring to FIG. 2, the input clutch plate is illustrated in greater detail. The grooves 61–64 sheared from the input clutch plate 12 at the outer diameter 60 include adjacent tabs 65–68 that are slanted at an angle. These grooves 61–64 and tabs 65–68 pump the magnetorheological fluid from the rear side to the front side of the input clutch plate 12. The slots 71–74 in the input clutch plate, in combination with the pumping grooves, enable continuous circulation of the magnetorheological fluid within the clutch cavity 38 when the input clutch plate 12 is rotating. This mixing enhances the fluid stability, and prevents fluid settling due to centrifugal forces. Further, the mixing also improves heat transfer properties of the fluid, resulting in better conduction efficiency to the fins of the front cover 20.

The cavity 38 is partially filled with magnetorheological fluid, so that when the clutch rotates, the centrifugal force pushes the fluid into a donut that just covers the active clutch plate area. This enables the fluid to be mostly out of contact with the seal, enhancing the life of the seal. The slots 71–74 on the input clutch plate 12 are designed so that the magnetorheological fluid tends to flow away from the seal 19 when the clutch is stationary. As seen in FIG. 1, any fluid on the upper rear side of the input clutch plate 12 will settle through the slots 71–74 to the front side under the effect of gravity when the clutch 10 is static. The recess 37 in the front cover 20 also helps ensure that the magnetorheological fluid collects below the seal 19 during nonrotation.

Magnetorheological fluids comprising a suspension of solid particles in a selected liquid are known wherein the fluid's yield stress must be exceeded in order to initiate flow. When the fluid is exposed to a magnetic field the flow threshold yield stress increases as the flux density in the field increases. Yield stress is also known to increase as the volume fraction of solid particles in the suspension is increased. Accordingly, a desired yield stress for a selected magnetorheological fluid operating in a clutch can be achieved by controlling the volume fraction of suspended particles. Magnetorheological fluids useful as in the present invention are described in detail by commonly assigned U.S. patent application Ser. No. 08/629,249 entitled "Magnetorheological Fluids," filed Apr. 8, 1996, and which is specifically incorporated herein by reference. For purposes of the present invention, the magnetorheological fluid contained in cavity 38 carries a selected volume percent of solid particles that permit substantially complete slippage between the input clutch plate 12 and the output clutch plates comprising front cover 20 and rear cover 21 when the clutch is disengaged. A gradually increasing torque transfer is effected between input and output plates as the clutch is engaging, and substantially complete coupling is provided when the clutch is fully engaged with minimal slippage between the input and output plates. The coil 40 is supplied with a variable current signal through a conductor (not illustrated).

Figure 3:
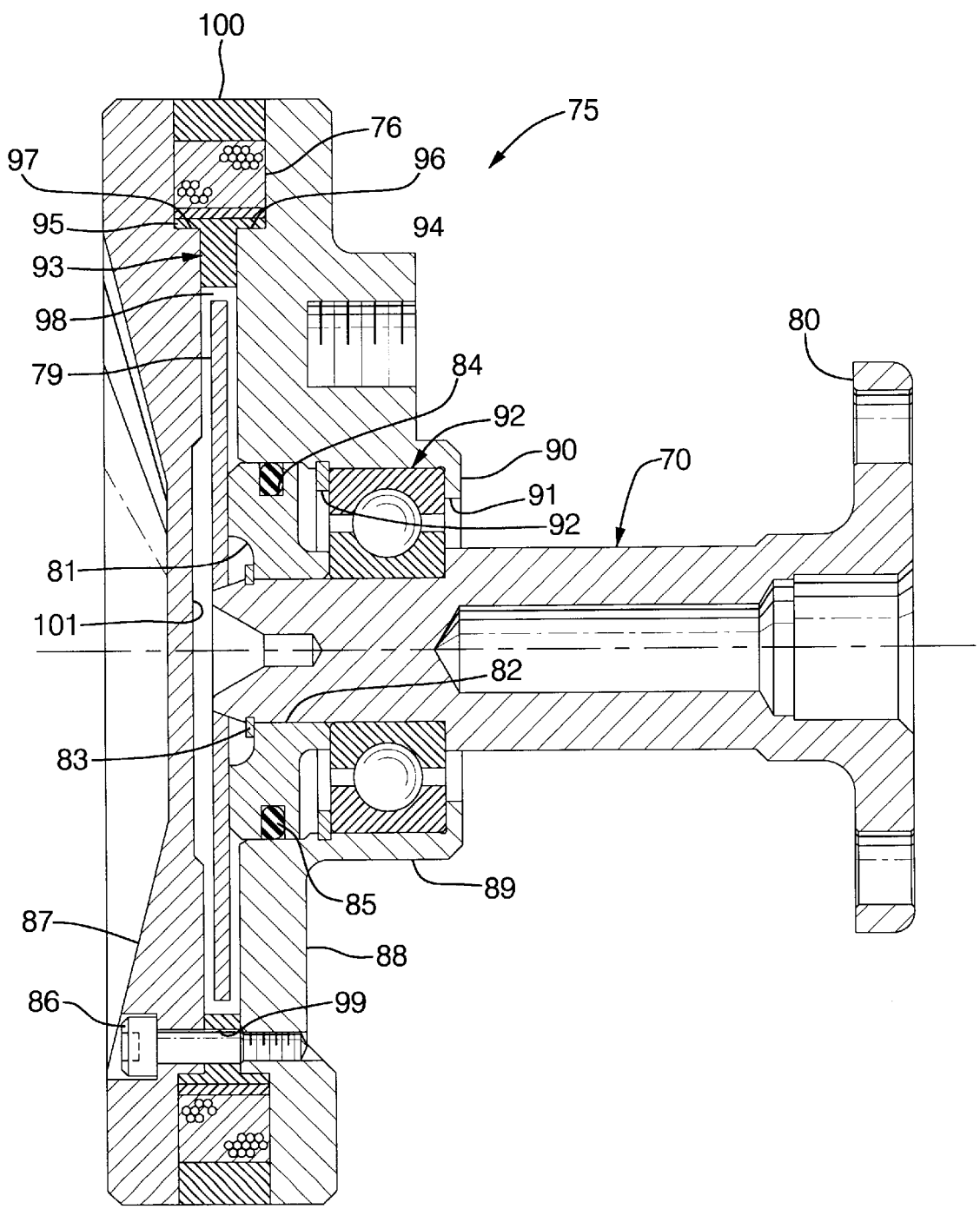
FIG. 3 is a cross sectional illustration of a fan clutch according to an alternative embodiment of the present invention.

FIG. 3 illustrates an alternative embodiment of the present invention designated as magnetorheological fluid fan clutch 75 also using the torque transmission characteristics of the contained fluid, which are variable in response to a variable electromagnetic field. Fan clutch 75 includes a rotating coil 76 carried between front cover 77 and rear cover 78. Fan clutch 75 is generally embodied as a single input plate design, with the coil 76 rotating with the covers 77,78. The input shaft 70 carries the single input clutch plate 79, which is made of a typical material such as steel by a common process such as stamping. The input shaft 79 is adapted to exhibit the same foot print at mounting flange 80 as commonly used existing viscous clutches, so that the magnetorheological fluid fan clutch 75 can be easily retrofitted to existing vehicle designs. The input clutch plate 79 is manufactured separately from the input shaft 70, and the two are connected by an intermediate seal housing 81. The seal housing 81 is made of a non-magnetizable material such as aluminum or stainless steel preventing flux leakage from the clutch plate 79 to the input shaft 70, advantageously maximizing the achievable torque capacity, and reducing the tendency of the suspended particles to be attracted, which could lead to premature seal wear. The seal housing 81 is formed in a generally annular shape with an opening 82 that receives the input shaft 70. Seal housing 81 is maintained on the input shaft 70 by a snap ring 83, and the input clutch plate 79 is preferably fastened to the seal housing 81 by a conventional means. An annular groove 84, formed around the periphery of the seal housing 81 houses an annular seal 85.

The input clutch plate 79 is housed between the front and rear covers 77 and 78 respectively, which also double as the output clutch plates. The front cover 77 and rear cover 78 are attached together with a plurality of bolts 86. Front cover 77 comprises a finned front wall 87 and is optionally covered by a finned aluminum shell (not illustrated), for improved heat dissipation. Rear cover 78 includes a radially extending wall 88 with an integral rearwardly extending wall 89 that engages seal 85. Wall 88 includes an inwardly turned terminal flange 90 providing an opening 91 that is received over the input shaft 70. Rear cover 78 is rotatably supported on input shaft 70 by a bearing assembly 92 that includes an inner race positioned on the input shaft 70 against the seal housing 81 and an outer race positioned in the wall 89 between terminal flange 90 and a snap ring 92. The inner and outer races are engaged by an interposed series of balls for relatively free rotation.

As a result, the rear cover 78 is normally substantially free wheeling on the input shaft 70. The rear cover 78 also supports the front cover 77 and an associated fan (not illustrated). The rear cover 78 and front cover 77 are engaged through a plate spacer 93. The plate spacer is annular with a T-shaped cross section and includes an inner radially directed section 94 that is received between the front cover 77 and the rear cover 78 and an outer axially directed section 95 that is received around a ledge 96 of the rear cover 21 and a ledge 97 of front cover 77. The plate spacer seals the outer area of cavity 98 and includes openings 99 that receive the bolts 86. The plate spacer 93 and the bolts 86 are non-magnetizable to maintain the integrity of the magnetic flux path. The plate spacer 93 is also made of a relatively soft conventional nonmagnetizable material, since it serves as a static seal for the magnetorheological fluid.

The shape and size of the front cover 77 is designed to avoid magnetic flux saturation, and simultaneously to minimize the amount of material used as permitted by mechanical strength requirements. This optimizes on the overall weight of the clutch. More specifically, the area of the flux path is relatively thick, while the center of the front cover 77 is dished out on the outside. The front cover 77 and the rear cover 78 act as the output clutch plates, and are made of conventional steel.

Coil 76 comprises a plurality of turns of wire and is held in the output section of the fan clutch 75. The coil wire is energized through slip rings (not shown), either on the input shaft 70 or the rear cover 78. The two clutch covers are magnetically joined through the core piece 100 that is made of conventional steel for magnetic permeability. For purposes of the present invention, the magnetorheological fluid contained in cavity 98 carries a selected volume percent of solid particles that permit substantially complete slippage between the input clutch plate 79 and the output clutch plates comprising front cover 77 and rear cover 78 when the clutch is disengaged. A gradually increasing torque transfer is effected between input and output plates as the clutch is engaging, and substantially complete coupling is provided when the clutch is fully engaged with minimal slippage between the input and output plates. The coil 76 is supplied with a variable current signal through a conductor (not illustrated). Magnetic flux generated by coil 76 passes through the magnetorheological fluid between the front and rear covers 77, 78 and through the input clutch plate 79 causing the suspended particles to concentrate and transfer torque during engagement. The recess 101 in the front cover 77 and slots (not shown), in the input clutch plate 79 are used to ensure that the magnetorheological fluid collects below the seal 85 during nonrotation. The seal 85 is enclosed in the seal housing 81 made of a non-magnetizable material to avoid attraction of the suspended particles.

Figure 4:
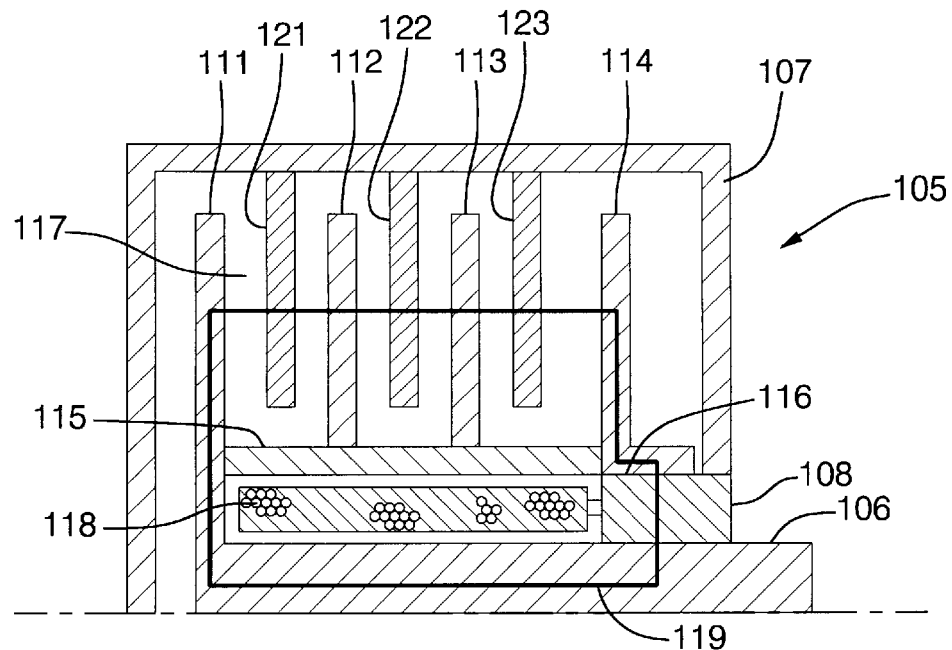
FIG. 4 is a schematic illustration of a fan clutch according to an alternative embodiment of the present invention.

Referring to FIG. 4, another alternative embodiment of the present invention is illustrated as magnetorheological fluid fan clutch 105. Fan clutch 105 is embodied as a multiple radial clutch plate design with the coil positioned inside the plates. The use of multiple radially disposed plates results in a compact size for a given torque transfer capacity. The input shaft 106 supports the housing 107 and a connected fan (not shown), through the bushing assembly 108. The input clutch plates 111–114 are attached to the input shaft 106, with the plates 112–114 carried by the spacer 115. The input clutch plates 111–114 are made of a magnetizable material such as steel. The spacer 115 is made of a nomnagnetizable material and is preferably splined for engagement with the plates 111–114.

The output clutch plates 121–123 are also magnetizable and are carried by the housing 107 which is nonmagnetizable. Preferably, the housing 107 is made of aluminum and is formed with a finned exterior surface for efficient heat dissipation. The cavity 117 between the clutch plates contains magnetorheological fluid for variable torque transmission between the input clutch plates 111–114 and the output clutch plates 121–123. Coil 118 is attached to the bushing assembly 108 in a nonrotating manner and is positioned radially inside the rotatable clutch plates. The coil 118 is selectively energizable to develop a variable magnetic flux 119. The bushing assembly 108 serves as a link in the magnetic circuit and as a load bearing member. The clearance 116 serves as an air gap in the magnetic circuit.

Figure 5:
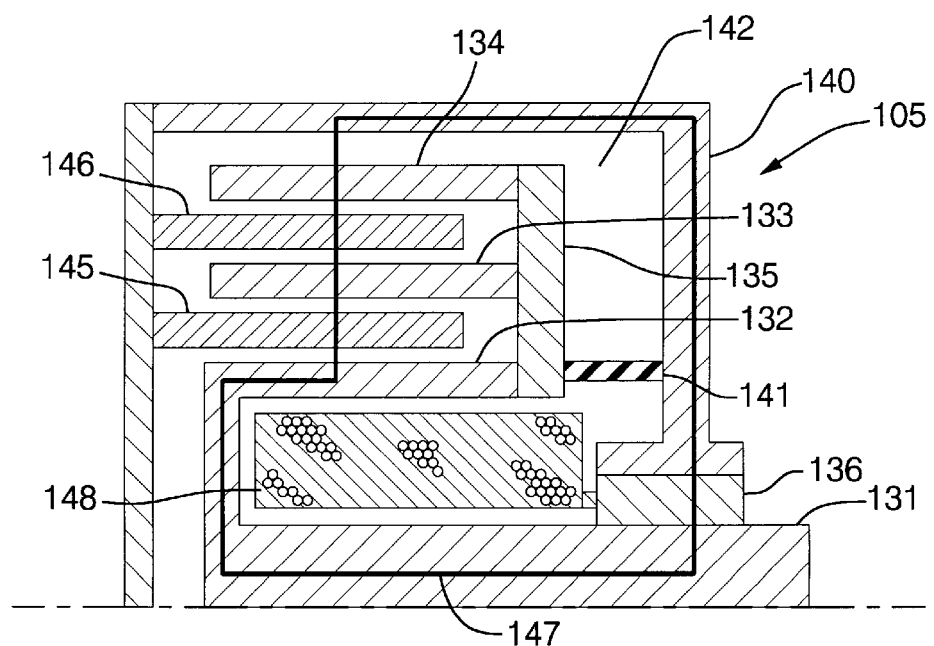
FIG. 5 is a schematic illustration of a fan clutch according to an alternative embodiment of the present invention.

FIG. 5 illustrates another embodiment of the present invention as magnetorheological fluid fan clutch 130. Fan clutch 130 advantageously facilitates assembly through the use of multiple cylindrical clutch plates with the coil positioned inside the plates. The input shaft 131 carries the input clutch plates 132–134 with assistance from the input spacer 135 which is nomnagnetizable. Bushing assembly 136 supports the housing 140 which carries a fan (not illustrated). The seal 141 contains the magnetorheological fluid in cavity 142. The input clutch plates 132–134 and the output clutch plates 145,146 carried by the housing 140, are cylindrically shaped providing a large interface area for the flux path 147 developed by energization of the coil 148.

Figure 6:
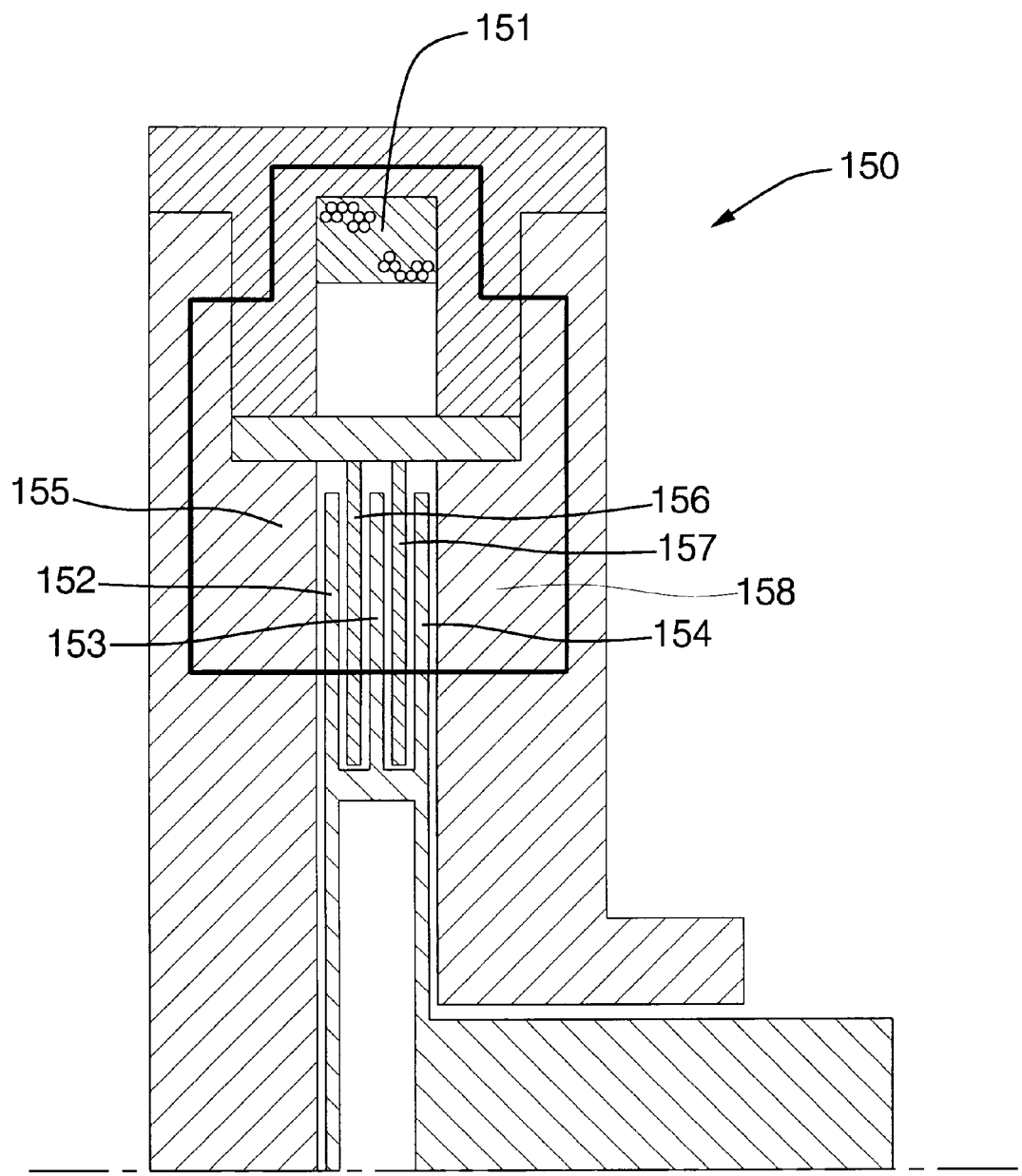
FIG. 6 is a schematic illustration of a fan clutch according to an alternative embodiment of the present invention.

Referring to FIG. 6, another alternative embodiment of the present invention is illustrated as magnetorheological fluid fan clutch 150. Fan clutch 150 is similar to the embodiment of FIG. 3 with the coil carried outside the plates but includes multiple radial clutch plates. Positioning the coil 151 radially outside the clutch plates improves the magnetic circuit strength. The use of multiple input plates 152–154 and multiple output plates 155–158 also contributes to torque transmission capabilities.

In accordance with the present invention, a magnetorheological fluid fan clutch provides the functional advantages of a modulating type fan drive in a relatively simple and cost effective design. The invention utilizes controllability of the yield shear stress of a magnetorheological fluid to effect a modulated drive characteristic. Packaging of the device to achieve desirable performance and physical characteristics according to aspects of the present invention is achieved through a variety of structural features that are applicable to various embodiments.

We claim:

1. A magnetorheological fluid fan clutch for effecting modulated rotational motion transmission comprising:

a rotatable input shaft;

an input clutch plate engaged with the input shaft to rotate in concert therewith;

a housing having a front cover and a rear cover forming a cavity about the input clutch plate wherein the front and rear covers operate as output clutch plates;

a nonmagnetic spacer positioned between the front and rear covers and radially outside the input clutch plate;

a bearing supporting the housing on the input shaft through the rear cover so that the input clutch plate is rotatable on the input shaft relative to the housing;

a quantity of magnetorheological fluid carried in the cavity through which torque is variably transferred between the input clutch plate and the housing;

a coil positioned radially outside the nonmagnetic spacer and carrying a variable electrical current to effect a variable magnetic field across the input clutch plate and through the magnetorheological fluid providing modulated torque transmission between the input clutch plate and the housing, wherein the input clutch plate includes a plurality of grooves pumping the magnetorheological fluid during rotation of the input shaft; and a seal housing carried on the input shaft against the input clutch plate and having a groove carrying a seal that bears against the housing sealing the cavity wherein the input clutch plate includes a plurality of slots so that the magnetorheological fluid settles through the slots and away from the seal during nonrotation of the input shaft.

2. A magnetorheological fluid fan clutch according to claim 1 wherein the front cover includes an internal central recess to assist in the settling of the magnetorheological fluid away from the seal.

3. A magnetorheological fluid fan clutch according to claim 2 wherein the rear cover includes an axially extending wall engaging the seal and has a terminal flange engaging the bearing.

4. A magnetorheological fluid fan clutch according to claim 3 further comprising a nonrotatable core carried on the input shaft and supporting the coil with an axially extending segment wherein the front cover includes a rearwardly directed wall that is disposed radially outside the axially extending segment of the core with an air gap between the axially extending segment and the rearwardly directed wall.

5. A magnetorheological fluid fan clutch for effecting modulated rotational motion transmission comprising:

a rotatable input shaft;

an input clutch plate engaged with the input shaft to rotate in concert therewith wherein the input clutch plate includes a plurality of grooves with adjacent angled surfaces and a plurality of slots positioned radially inside the plurality of grooves;

a housing having a front cover and a rear cover forming a cavity about the input clutch plate wherein the front and rear covers operate as output clutch plates and wherein the front cover has a dished outside and a recessed inside and wherein the rear cover has an axially extending wall with a terminal flange;

a nonmagnetic spacer positioned between the front and rear covers and radially outside the input clutch plate, the nonmagnetic spacer having an opening;

a nonmagnetic bolt extending through the front cover, the rear cover and the opening of the nonmagnetic spacer fastening the front and rear covers together;

a bearing supporting the housing on the input shaft through the axially extending wall of the rear cover against the terminal flange so that the input clutch plate is rotatable on the input shaft relative to the housing;

a quantity of magnetorheological fluid carried in the cavity through which torque is variably transferred between the input clutch plate and the housing; and a coil positioned radially outside the nonmagnetic spacer and carrying a variable electrical current to effect a variable magnetic field through the front and rear covers, across the input clutch plate and through the magnetorheological fluid providing modulated torque transmission between the input clutch plate and the housing, wherein the plurality of grooves in the input clutch plate pump the magnetorheological fluid during rotation of the input shaft and wherein the plurality of slots in the input clutch plate facilitate settling of the magnetorheological fluid when the input shaft is non-rotating.

6. A magnetorheological fluid fan clutch according to claim 5 further comprising a seal housing carried on the input shaft against the input clutch plate and having a groove carrying a seal that bears against the rear cover sealing the cavity, wherein the plurality of slots facilitate settling of the magnetorheological fluid away from the seal.

7. A magnetorheological fluid fan clutch according to claim 5 further comprising a nonrotatable core carried on the input shaft and supporting the coil with an axially extending segment wherein the front cover includes a rearwardly directed wall that is disposed radially outside the axially extending segment of the core with an air gap between the axially extending segment and the rearwardly directed wall.

8. A magnetorheological fluid fan clutch for effecting modulated rotational motion transmission comprising:

a rotatable input shaft;

an input clutch plate engaged with the input shaft to rotate in concert therewith wherein the input clutch plate includes a plurality of grooves with adjacent angled surfaces and a plurality of slots positioned radially inside the plurality of grooves;

a housing having a front cover and a rear cover forming a cavity about the input clutch plate wherein the front and rear covers operate as output clutch plates and wherein the front cover has a dished outside and a recessed inside and wherein the rear cover has an axially extending wall with a terminal flange;

a nonmagnetic spacer positioned between the front and rear covers and radially outside the input clutch plate, the nonmagnetic spacer having an opening and an inner radially directed section received between the front cover and the rear cover and an outer axially directed section received around a first ledge of the rear cover and second ledge of the front cover;

a nonmagnetic bolt extending through the front cover, the rear cover and the opening of the nonmagnetic spacer fastening the front and rear covers together;

a bearing positioned on the input shaft and supporting the housing on the input shaft through the axially extending wall of the rear cover and engaging the housing between the terminal flange and a snap ring so that the input clutch plate is rotatable on the input shaft relative to the housing;

a quantity of magnetorheological fluid carried in the cavity through which torque is variably transferred between the input clutch plate and the housing; and a coil positioned radially outside the nonmagnetic spacer and carrying a variable electrical current to effect a variable magnetic field through the front and rear covers, across the input clutch plate and through the magnetorheological fluid providing modulated torque transmission between the input clutch plate and the housing, wherein the plurality of grooves in the input clutch plate pump the magnetorheological fluid during rotation of the input shaft and wherein the plurality of slots in the input clutch plate facilitate settling of the magnetorheological fluid when the input shaft is non-rotating.

9. A magnetorheological fluid fan clutch according to claim 8 further comprising a nonrotatable core supported on the input shaft by a bearing and carrying the coil with an axially extending segment wherein the front cover includes a rearwardly directed wall that is disposed radially outside the axially extending segment of the core with an air gap between the axially extending segment and the rearwardly directed wall.

10. A magnetorheological fluid fan clutch according to claim 8 further comprising a core positioned radially outside the coil between the front and rear covers wherein the magnetic field is conducted through the core.

* * * * *